No. 691,831. Patented Jan. 28, 1902.
J. WILKINSON.
VEHICLE FRAME.
(Application filed Apr. 2, 1900.)
(No Model.) 3 Sheets—Sheet 1.
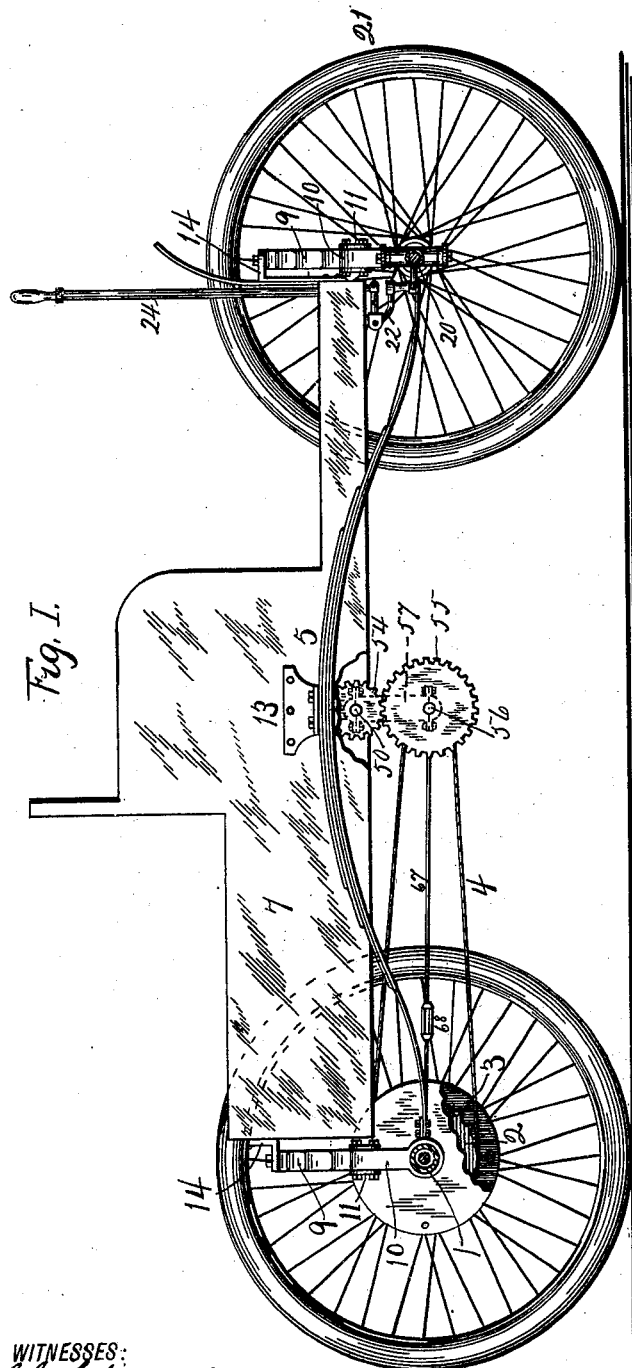
Fig. I.
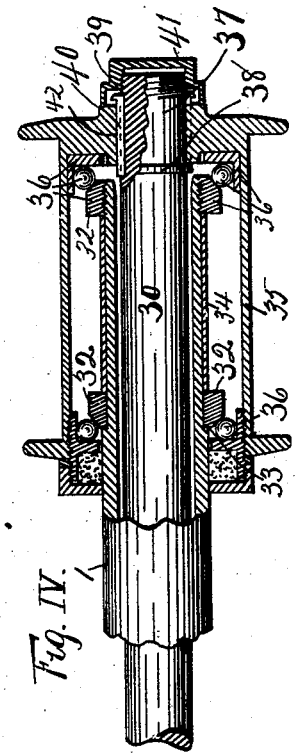
Fig. IV.
WITNESSES:
C. C. Schoeneck
M. J. Brownell
INVENTOR
John Wilkinson
BY
Alfred Wilkinson
ATTORNEY No. 691,831.  
J. WILKINSON.  
VEHICLE FRAME.  
(Application filed Apr. 2, 1900.)  
Patented Jan. 28, 1902.
(No Model.)
3 Sheets—Sheet 2.
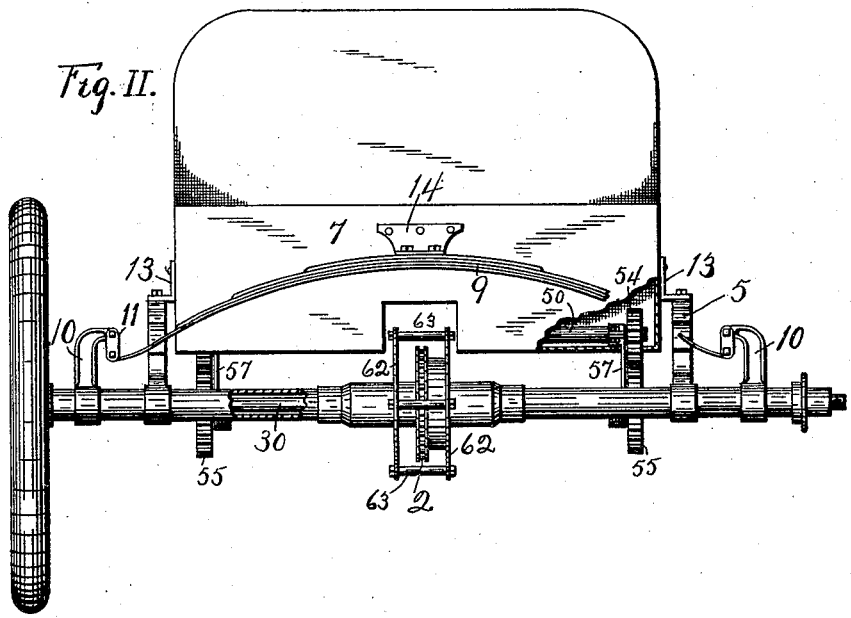
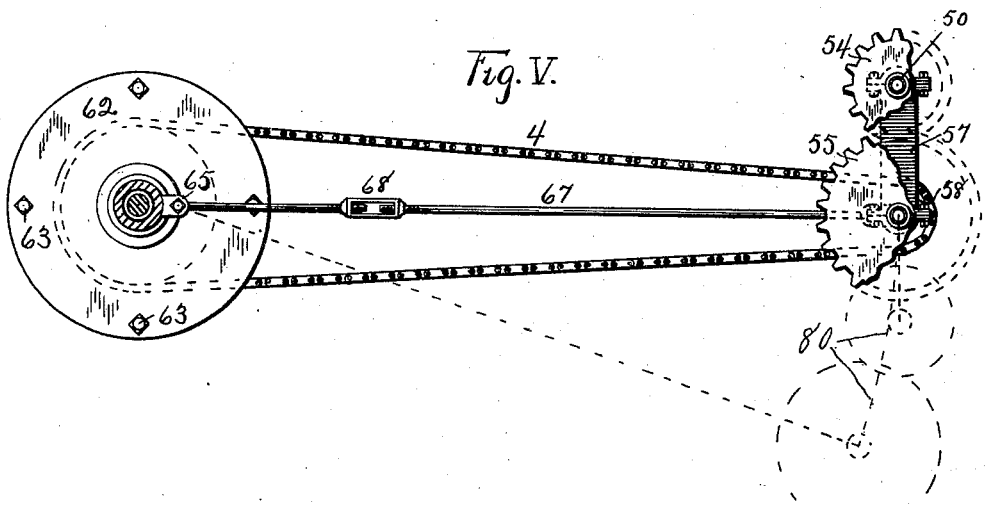
WITNESSES:
INVENTOR  
John Wilkinson  
BY  
Alfred Wilkinson  
ATTORNEY

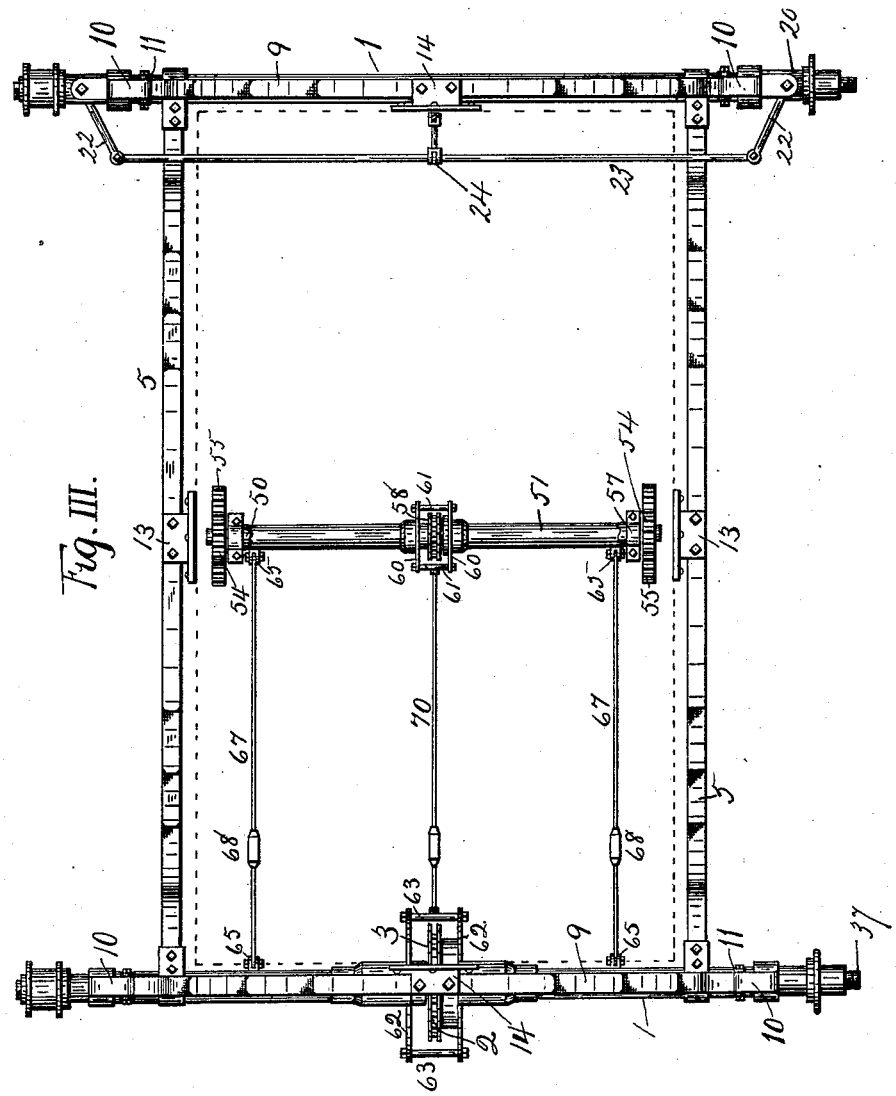

UNITED STATES PATENT OFFICE.

JOHN WILKINSON, OF SYRACUSE, NEW YORK.

VEHICLE-FRAME.

SPECIFICATION forming part of Letters Patent No. 691,831, dated January 28, 1902.

Application filed April 2, 1900. Serial No. 11,060. (No model.)

*To all whom it may concern:*

Be it known that I, JOHN WILKINSON, of Syracuse, in the county of Onondaga, in the State of New York, have invented new and useful Improvements in Vehicle-Frames, of which the following, taken in connection with the accompanying drawings, is a full, clear, and exact description.

My invention relates to a frame for automobile vehicles of simple, strong, and economical construction. It will be understood by reference to the accompanying drawings, in which the same numerals indicate the same parts in the different figures.

Figure I is a side elevation of a vehicle, showing my invention, portions broken away and the axles shown in section. Fig. II is a rear elevation with portions broken away. Fig. III shows in plan the frame. Fig. IV is a longitudinal section showing the manner in which the hub and wheel are supported on the frame and driven. Fig. V is a side elevation of a portion of the frame detached, showing the chain-supporting parts.

In the drawings, 1 indicates the tubular axles of a front-steering rear-driven vehicle in connection with which I have described my invention, the rear axle being in two sections connected by plates, &c., hereinafter described. Within the sections of the rear axle are arranged the sections 30 30 of the driving-axle, connected by compensating gear 2 and provided with sprocket 3 for chain 4.

I have dispensed with the reach in my construction and connected the tubular axles by the side springs 5 5, permitting the wagon-body to fit within the axles and springs and drop as low as may be desired.

9 9 are the front and rear springs, supported on their axles in any desirable way, as by hangers 10 10, links 11 11, &c. The wagon-body is carried by the four springs by means of side hangers 13 13 and end hangers 14 14, so that substantially the entire weight of the vehicle, including the motor, is supported on the ends of the axles almost over the wheels, avoiding the strain and tarving of the wheels, as in vehicles supported on the center of the axles. I have shown the front-wheel axles 20 20 supporting the front wheels 21 21 and connected by arms 22 22 and rod 23 to steering-lever 24, all of usual construction. The front axle 1 is not necessarily tubular, though preferably so made.

In Fig. IV is best shown the arrangement of the rear hubs, the important feature thereof being that the hub and wheel are supported on the stationary tubular axle and not on the driving-axle, the former taking the end thrust directly and taking all strain off the latter, except the torsional strain of driving. On each end of the tubular axle are arranged cones 32 32 against the shoulder 33, separated, if desired, by a spacing-tube 34. The hub 35, of suitable construction, is provided with the usual ball-bearings 36 36, of which said cones are a part, the hub and wheel thus being supported on the end of the stationary tubular axle, the outwardly-extending end 37 of the driving-axle being formed with collar 38 and one or more keyways 39 and the hub with corresponding keyways 42, to which are fitted keys 40, connecting the hub to the driving-axle. 41 is a cap fitted to the threaded end 37 for covering these parts and forcing the hub home against the collar 38. In case of accident it is easy to unscrew the cap and knock out the keys on one side, permitting that wheel to run free and the vehicle to be driven from the other wheel alone. This arrangement of hub and axles may be used with any style of bearing, not necessarily with ball-bearings.

Referring more particularly to the portion of the frame carrying the chain, 50 is the motor-shaft, driven by any desirable motor and supported in suitable bearings. 54 54 are the motor-shaft gears, meshing with gears 55 55 on the counter-shaft 56, running in bearings in counter-shaft tube 51. This tube is carried on hangers 57 57, which are supported concentrically with the motor-shaft, so as to swing freely, as best shown in Figs. I and V. On the counter-shaft is the sprocket 58, in alinement with sprocket 3 and arranged within disk-plates 60 60 and bolts 61 61, which connect the sections of tube 51. The sections of the tubular rear axle are connected by corresponding disk-plates 62 62 and bolts 63 63. To ears 65 65 on the fixed rear axle and the counter-shaft tube are attached on both sides struts 67 67, provided with turnbuckles 68 68, by which the chain is easily adjusted. By reference to Fig. V it will be seen that by this construction of frame the gears 54 54 and 55 55 are held in perfect mesh and the tension of the chain maintained under all movements of the parts. This counter-shaft is free to move in an arc 80, (indicated in dotted lines,) while the motor-shaft moves up and down without loosening the chain, and the relation of the gears is maintained constant by the hangers.

A central strut 70 may be secured to bolts 61 and 63 to stiffen the parts and counteract direct pull and bending strain of chain on counter-shaft and tube and tubular rear axle.

My frame is composed of few parts and is simple, light, and economical. It is very strong, opposing a spring resistance to all shocks. The wheels adapt themselves easily to the varying surface of the road. The body is supported within the axles and side springs as near to the ground as may be desired, with the weight on the ends of the axles near the wheels. The vehicle is safer because supported on the fixed rear axle, so that injury to the driving-axle does not let the body drop.

Having thus fully described my invention, what I claim, and desire to secure by Letters Patent, is—

1. In combination in an automobile vehicle, a tubular rear axle, side springs connecting said axles and secured thereto near their ends, a sectional driving-axle arranged in said tubular axle and having its ends extending outwardly beyond the ends thereof, collars on said driving-axle ends adjacent to the ends of the tubular axle, ball-bearings on the ends of the tubular axle for the wheels, the wheels fitted thereto, keys fitted to corresponding keyways in the ends of the driving-axle and in the hubs to connect the wheels to the driving-axle, and a screw-cap fitted to the threaded end of said driving-axle to cover the parts and force the hub against the collar, substantially as described and shown.

2. In combination in an automobile vehicle, a front axle, a tubular rear axle, side springs connecting said axles and secured thereto near their ends, a sectional driving-axle arranged in said tubular axle and having its ends extending outwardly beyond the ends thereof, ball-bearings on the ends of said tubular axle, wheels and hubs fitted to said bearings, the cup of the inner ball-bearing of each wheel threaded to be secured to the inner end of the hub, a cap fitted to the tubular axle and threaded also to engage with the inner end of the hub, and means for securing the hub and wheel to the end of the driving-axle, substantially as described and shown.

3. In combination in an automobile vehicle, a front axle, a sectional tubular rear axle connected to the front axle by side springs, a sectional driving-axle arranged within said tubular axle, its sections connected by a compensating gear, a sprocket on said driving-axle, a motor-shaft supported on the vehicle-frame parallel to said axles, gears on the ends of said motor-shaft, hangers free to swing and supported concentrically with the ends of the motor-shaft, a counter-shaft tube carried on the lower ends of said hangers parallel to said motor-shaft and axles, a sectional counter-shaft sustained in said tube, gears on the ends of said counter-shaft in mesh with said motor-shaft gears, a sprocket on the counter-shaft in alinement with the rear-axle sprocket and a compensating gear connecting the counter-shaft sections, corresponding disk-plates and bolts for connecting the sections respectively of the tubular rear axle and of the counter-shaft tube, a central strut secured to the disk-plate bolts of the tubular axle and of the counter-shaft tube and a driving-chain connecting the sprockets.

4. In combination in an automobile vehicle, a front axle, a sectional tubular rear axle connected to the front axle by side springs, a sectional driving-axle arranged within said tubular axle, its sections connected by a compensating gear, a sprocket on said driving-axle, a motor-shaft supported on the vehicle-frame parallel to said axles, gears on the ends of said motor-shaft, hangers free to swing and supported concentrically with the ends of the motor-shaft, a counter-shaft tube carried on the lower ends of said hangers parallel to said motor-shaft and axles, a sectional counter-shaft sustained in said tube, gears on the ends of said counter-shaft in mesh with said motor-shaft gears, a sprocket on the counter-shaft in alinement with the rear-axle sprocket and a compensating gear connecting the counter-shaft sections, corresponding disk-plates and bolts for connecting the sections respectively of the tubular rear axle and of the counter-shaft tube, corresponding ears on the ends of said counter-shaft and of said tubular axle, struts provided with turnbuckles secured to said ears on each side, a central strut secured to the disk-plate bolts of the tubular axle and of the counter-shaft tube and a driving-chain connecting the sprockets.

In testimony whereof I have hereunto signed my name.

JOHN WILKINSON. [L. S.]

Witnesses:
 M. T. BROWNELL,
 FORMAN WILKINSON.